(No Model.)
R. P. LANDRUM.
SHEEP SHEARS.
No. 555,778. Patented Mar. 3, 1896.
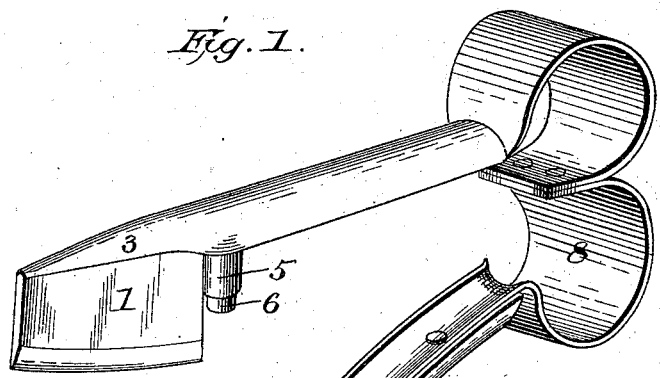
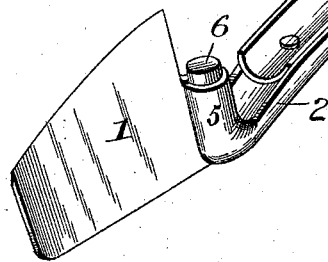
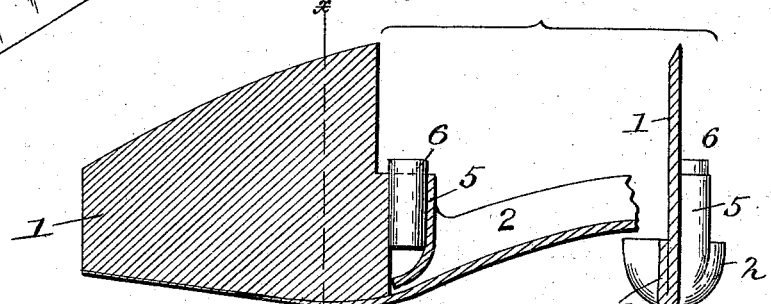
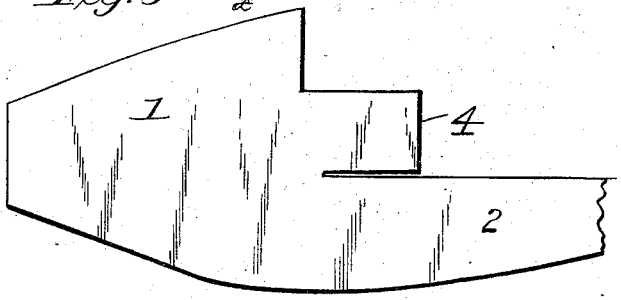
WITNESSES
INVENTOR
Robert P. Landram
Attorney

UNITED STATES PATENT OFFICE.

ROBERT P. LANDRUM, OF JULESBURG, COLORADO.

SHEEP-SHEARS.

SPECIFICATION forming part of Letters Patent No. 555,778, dated March 3, 1896.

Application filed March 12, 1895. Renewed January 21, 1896. Serial No. 576,348. (No model.)

*To all whom it may concern:*

Be it known that I, ROBERT P. LANDRUM, a citizen of the United States, residing at Julesburg, in the county of Sedgwick and State of Colorado, have invented certain new and useful Improvements in Sheep-Shears; and I do declare the following to be a full, clear, and exact description of the invention, such as will enable others skilled in the art to which it appertains to make and use the same.

My invention relates to sheep-shears.

The object of the invention is to provide the shears with spring-buffers to prevent the jarring of the blades, as well as to lessen the noise in operation and to simplify the construction, whereby the shears may be produced at a small cost.

With these objects in view the invention consists in certain features of construction and combinations of parts, which will be hereinafter fully described and claimed.

In the drawings, Figure 1 is a perspective view of my improved sheep-shears. Fig. 2 is a longitudinal vertical sectional view through one of the blades and a portion of the spring connected thereto. Fig. 3 is a view of one of the blades before it is bent into the shape shown in Fig. 1.

In the drawings, 1 denotes the blades, each of which has a semicircular handle extension 2, one edge of which, 3, is bent down over the back of the blade to strengthen the same. The inner edge of each blade is provided with the lip 4, as shown in Fig. 3, which lip is bent to form a socket 5 for the reception of a spring-buffer 6, which in the present instance is shown as a rubber plug, these lips being arranged on the opposite sides of the blades, as shown. Secured to the handle extensions are the ends of bow-springs 8, the outer ends of the bow-springs being bolted together. These springs exert their energy to separate the blades. The shears, owing to their simplicity of construction, may be manufactured at a small cost, and in operation the noise and jarring incident to devices of this character are obviated, thus lessening the toil of the operator.

From the foregoing description, taken in connection with the accompanying drawings, the operation and advantages of this invention will be readily understood without further explanation.

Although I have shown and described the preferred construction, I desire to have it understood that I do not wish to be restricted to the exact details, but reserve to myself the right to make such changes as suggest themselves to an ordinary mechanic.

What I claim, and desire to secure by Letters Patent, is—

The combination with the blades and their handle extensions, said extensions being bent down over the back of the blades to strengthen the same and the blades being provided with lips, which are bent to form seats for the buffers, each of said blades, its handle extension and its socket being formed of one piece of metal, spring-buffers seated in said sockets, and bow-springs bolted together and having their free ends secured to the handle extensions, substantially as set forth.

In testimony whereof I affix my signature in presence of two witnesses.

ROBERT P. LANDRUM.

Witnesses:
H. EPPERSON,
L. E. LOVELAND.